United States Patent [19]
DeRosa

[11] 3,963,055
[45] June 15, 1976

[54] SELF-SEALING FUEL LINE

[76] Inventor: John DeRosa, P.O. Box 1211, Clear Lake Highlands, Calif. 95422

[22] Filed: Dec. 20, 1974

[21] Appl. No.: 534,739

[52] U.S. Cl. .............................. 138/140; 138/89; 138/177; 123/198 DB
[51] Int. Cl.² ................. F16L 9/14; F16L 55/10; F16L 9/00; F02B 77/00
[58] Field of Search ............ 138/140, 155, 177, 97, 138/DIG. 11, 100, 101, 89, 114, 103; 123/198 DB, DIG. 2; 222/53, 96, 52; 137/67, 68 R, 68 A, 797, 38, 48, 804, 351, 354, 355, 479, 483; 285/4

[56] References Cited
UNITED STATES PATENTS
3,276,447  10/1966  Hamilton .................... 138/89 X Primary Examiner—Richard E. Aegerter
Assistant Examiner—Larry Jones
Attorney, Agent, or Firm—Melvin R. Stidham

[57] ABSTRACT

A conduit for a volatile fluid comprises principle lengths of a hard material having a relatively high tensile strength interrupted by rings of a soft ductile material. When the tube is subjected to an impact or excessive forces sufficient to cause rupture, the ductile rings are first drawn to a relatively small diameter, pinching off an inner, resilient seal tube to shut off further flow.

1 Claim, 4 Drawing Figures

U.S. Patent June 15, 1976 3,963,055
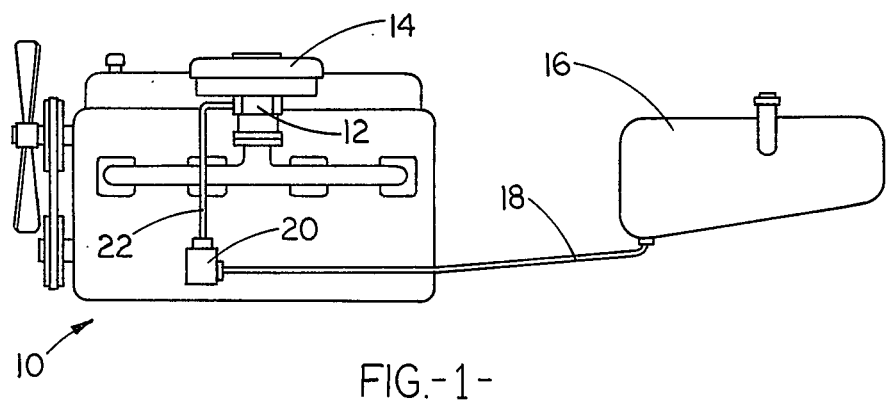
FIG.-1-
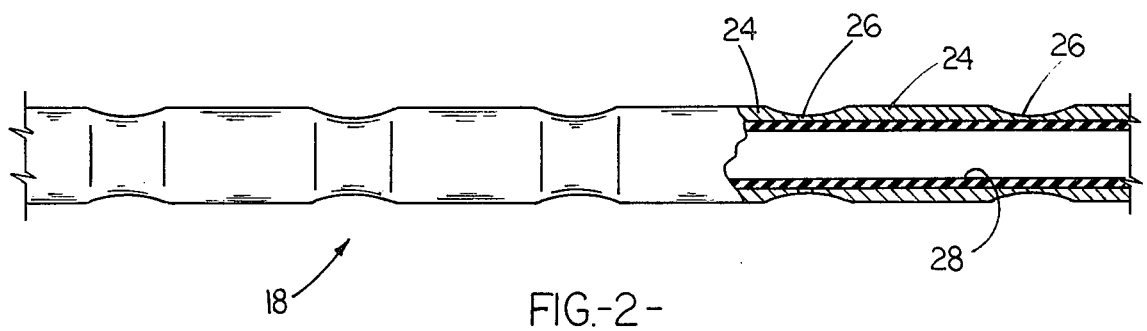
FIG.-2-
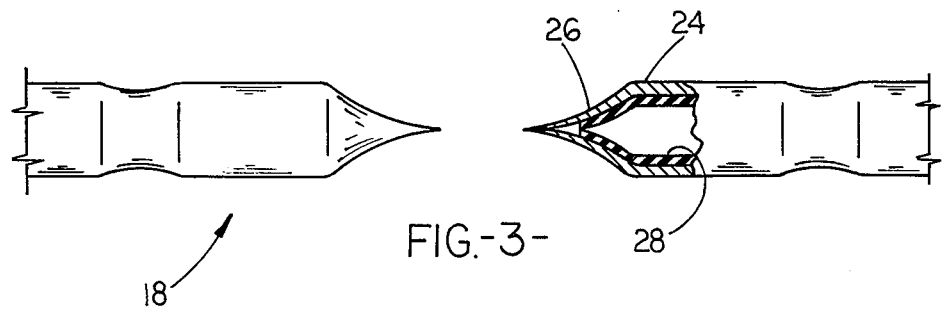
FIG.-3-
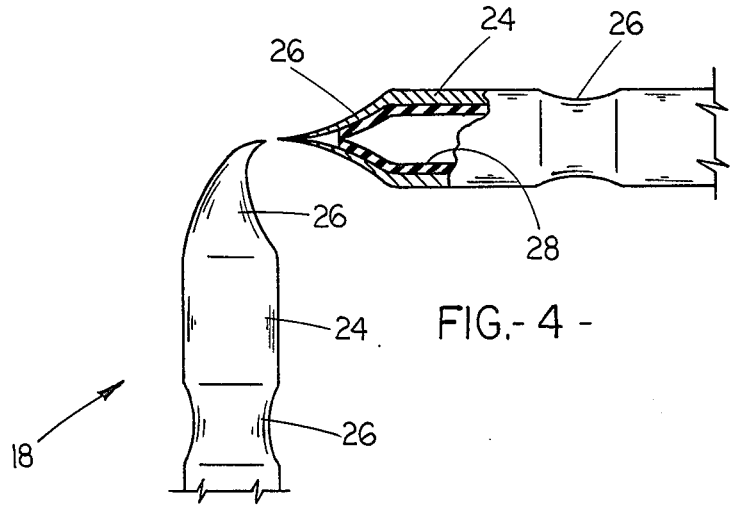
FIG.-4-

SELF-SEALING FUEL LINE

BACKGROUND OF THE INVENTION

In many collisions involving motor vehicles, aircraft, watercraft and the like, fuel lines are subjected to impacts or other excessive stresses sufficient to cause rupture, with the result that a considerable amount of highly volatile gasoline or other fuel is spilled into the immediate surroundings. Such fuel may be easily ignited as by sparks generated during the collision, greatly increasing the possibility of personal injury, and in any event, increasing the damage to the vehicles involved.

OBJECTS OF THE INVENTION

It is an object of this invention to provide a conduit for a volatile fluid which closes off, or minimizes leakage in the event of rupture.

It is a further object of this invention to provide a vehicle fuel line which prevents leakage in the event of a collision-produced rupture.

It is a further object of this invention to provide a self-sealing fuel line.

Other objects and advantages of this invention will become apparent from the description to follow when read in conjunction with the accompanying drawings.

BRIEF SUMMARY OF THE INVENTION

In carrying out this invention there is provided a fuel line comprising a tubular duct with a series of primary lengths of a fairly hard material having a relatively high tensile strength. Intermediate the primary lengths are rings of a soft, ductile material which are preferably of a smaller diameter. The ductile rings may be formed by locally annealing the metal, e.g. aluminum, preferably while under hoop stresses which constrict the tube and form small diameter, ductile rings. An inner tube of a resilient, seal material, such as rubber, is carried within the duct. If the conduit is subjected to impact or other excessive stresses, such as tension, twisting or bending, as in the event of an automobile accident, the ductile rings are drawn to a relatively fine thread prior to rupture. This pinches off the inner tube and seals off the ruptured ends of the duct against leakage, preventing the dissemination of highly volatile fuels.

BRIEF DESCRIPTION OF THE DRAWINGS

In the drawings:

FIG. 1 is a more or less schematic elevation view of an automotive engine and fuel tank;

FIG. 2 is an enlarged elevation view, partially broken away, of a fuel line embodying features of this invention; and FIGS. 3 and 4 are enlarged elevation views, partially broken away showing rupture of the fuel line under tensile and bending forces.

DESCRIPTION OF A PREFERRED EMBODIMENT

Referring now to FIG. 1 there is shown an automotive engine 10 including a carburetor 12 on which is mounted an air cleaner 14. From a fuel tank 16 preferably of the self-sealing type, a suction fuel line 18 is connected to a fuel pump 20, with a discharge line 22 extending from the fuel pump to the carburetor 12. In the event that the vehicle (not shown) in which the engine 10 is mounted is involved in a collision, or the fuel line 18, 22 is otherwise subjected to impact or excessive stresses sufficient to cause rupture, it is highly desirable to minimize the amount of volatile fluid, e.g. gasoline or diesel fuel, which is dumped into the area of the accident, thus minimizing vehicular damage and reducing the hazards of serious personal injury. Accordingly, the fuel line 18, 22 of this invention is adapted to shut off, or at least minimize spillage in the event of such ruptures.

Referring now to FIG. 2 the fluid conduit 18 includes an outer tubular member which comprises a series of primary lengths 24 of a hard material having relatively high tensile strength, such as aluminum. Intermediate the successive lengths 24 of the hard material are smoothly curved, depressed rings 26 of a softer, relatively ductile material. The ductile rings may be formed by localized annealing of aluminum preferably under constricting hoop stress whereby the aluminum rings 26 are softened and rendered ductile, as well as reduced in outer diameter and, hence, thickness. Either before or after annealing, an inner tube 28 of a resilient seal material, such as rubber, is inserted into the conduit 18 for a purpose hereinafter to be described.

Referring now to FIGS. 3 and 4, when the conduit 18 is placed under tension or sharply bent, the stress is concentrated in one or more ductile rings 26 drawing it to a reduced diameter and, where the force is excessive, reduces it in cross section approaching that of a fine wire before rupturing. As the ductile ring is greatly reduced in diameter, it pinches off the rubber liner to seal off further flow through the tube 18. In some cases, the ductile ring 26 will be so reduced in cross section as to leave virtually no internal diameter and close off further flow itself.

While this invention has been described in conjunction with a preferred embodiment thereof, it is obvious that modifications and changes therein may be made by those skilled in the art without departing from the spirit and scope of this invention, as defined by the Claims appended hereto.

Having described my invention I claim:

1. A conduit for a hazardous fluid comprising:
    a continuous one-piece outer tubular metallic member with primary lengths thereof of a first diameter being formed of rigid material of a given thickness and having relatively high tensile strength;
    rings of a ductile material and of a diameter smaller than said first diameter and of reduced thicknesses less than the thicknesses of said primary lengths interposed between said rigid lengths at intervals along the length of said tubular member;
    the metal of said tubular member having been softened at intervals to form said ductile rings; and
    an inner tubular member of a resilient material effective when pinched to block fluid flow therethrough.

* * * * *